US006906622B2

(12) United States Patent
Kleinschmidt et al.

(10) Patent No.: US 6,906,622 B2
(45) Date of Patent: Jun. 14, 2005

(54) SYSTEM FOR SENSING A HEAD-ON COLLISION IN A MOTOR VEHICLE

(75) Inventors: Simone Kleinschmidt, Tamm (DE); Michael Roelleke, Leonberg-Hoefingen (DE); Armin Koehler, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/344,060

(22) PCT Filed: May 31, 2002

(86) PCT No.: PCT/DE02/01984
§ 371 (c)(1),
(2), (4) Date: Dec. 16, 2003

(87) PCT Pub. No.: WO02/098708
PCT Pub. Date: Dec. 12, 2002

(65) Prior Publication Data
US 2004/0088094 A1 May 6, 2004

(30) Foreign Application Priority Data

Jun. 6, 2001 (DE) .......................................... 101 27 326
Aug. 7, 2001 (DE) .......................................... 101 38 764

(51) Int. Cl.⁷ ............................................... B60Q 1/00
(52) U.S. Cl. ....................... 340/436; 340/435; 340/438; 340/903; 340/905
(58) Field of Search ................................ 340/436, 438, 340/435, 903, 905; 701/45, 46; 180/217, 282, 167, 169; 280/728.1, 735; 307/10.1, 121

(56) References Cited

U.S. PATENT DOCUMENTS

| 5,504,379 | A | * | 4/1996 | Mazur et al. | 307/10.1 |
| 6,070,113 | A | * | 5/2000 | White et al. | 701/45 |
| 6,274,948 | B1 | * | 8/2001 | Blank et al. | 307/10.1 |
| 6,292,728 | B1 | * | 9/2001 | Masegi | 701/45 |

FOREIGN PATENT DOCUMENTS

| DE | 42 02 460 | 7/1992 |
| DE | 197 40 019 | 3/1999 |
| GB | 2 293 681 | 4/1996 |
| JP | 02 155862 | 6/1990 |
| WO | WO 97 48582 | 12/1997 |

\* cited by examiner

*Primary Examiner*—Hung Nguyen
(74) *Attorney, Agent, or Firm*—Kenyon & Kenyon

(57) ABSTRACT

A system for sensing a head-on collision in a vehicle, where at least one upfront sensor is used as plausibility sensor, which provides a plausibility signal for a collision sensor located in the control device. The upfront sensor may be an acceleration sensor, which analyzes both the acceleration signal as well as the speed signal derived therefrom for a plausibility check. The results of this check are linked in an OR-operation in order to generate a plausibility signal. In an example embodiment, it is provided to buffer-store the plausibility signal in the control device for a predetermined time. This is of special interest for improved reliability in the event that the upfront sensor has been destroyed.

4 Claims, 3 Drawing Sheets

SYSTEM FOR SENSING A HEAD-ON COLLISION IN A MOTOR VEHICLE

FIELD OF THE INVENTION

The present invention is based on a system for sensing a head-on collision in a vehicle having the features of the independent claim.

BACKGROUND INFORMATION

United Kingdom Published Patent Application No. 22 93 681, describes a conventional upfront sensor for determining plausibility for the triggering decision of the central control unit for restraint systems.

International Published Patent Application No. WO 97/48582 describes a system for sensing a head on collision. In this context, an impact sensor is accommodated in a control device, and an additional collision sensor is located in the vehicle front as an upfront sensor. This upfront sensor is used as plausibility sensor for the impact sensor in the control device. From German Published Patent Application No. 42 02 460, a system may be gathered in which an acceleration signal is linked in an OR-operation to a speed signal of an acceleration sensor. In German Published Patent Application No. 197 40 019 it is described to buffer-store a plausibility signal for a predefined time.

SUMMARY

In contrast, the system according to the present invention for sensing a head-on collision in a vehicle has the advantage over the related art that a logical OR-operation of an acceleration and a speed signal of the upfront sensor is implemented to determine the plausibility of a triggering decision made in the central control unit. This OR-operation results in an increased reliability of the plausibility decision. In low-speed frontal crashes and soft crashes, the integrated upfront signal, i.e. the speed, supports the triggering by the triggering algorithm. That means that in these crashes there is a lowest upfront-integration threshold for the belt tightener, which, contemporaneously or prior to the triggering decision, is exceeded by the central device. This threshold, or a slightly lower one, may be used for the plausibility check. The upfront algorithm ensures the function of this plausibility threshold. The second upfront-plausibility threshold, which relates to the acceleration signal, is required for rapid, hard crashes, which, via the central control device, already trigger at a time when the upfront sensor has not yet been hit and thus has not reached a satisfactory integrator state. However, due to the impact, strong acceleration vibration impulses are already seen at this point, which may be used for a plausibility check. In this way, the logical OR-operation makes it possible for the plausibility sensor to detect both possibilities, a low-speed frontal crash and a hard frontal crash, as trigger-relevant. This results in an increased reliability of the entire restraint system.

The plausibility signal, which is the result of the acceleration or speed compared to the respective thresholds, may be buffer-stored for a certain time in order to be still available even if the upfront sensor is briefly unavailable. This, too, allows an increased margin of safety, even if the upfront sensor has already been destroyed, for instance, during a frontal crash.

The control unit, in response to a signal of the at least one impact sensor, may inhibit the triggering of the restraint means in the control device even below a predefined threshold. For example, this is true for the noise threshold, so that, if the signal from the impact sensor in the control unit is so low as to still be in the noise stage, no triggering of the restraint means will occur.

However, if the signal of the impact sensor in the control device is above the noise threshold and the buffer-stored plausibility signal is above the respective plausibility threshold, the control device is theoretically ready to trigger, and a triggering decision requested by the algorithm is not suppressed, but instead results in a triggering of the restraint means.

DETAILED DESCRIPTION

To improve the reliability of a triggering decision of an air bag control device, an additional plausibility sensor may be used in the control device, in addition to the acceleration sensor. However, this plausibility sensor may be used in the control device in a decentralized manner as well, for instance, as an upfront sensor. In this context, appropriate combinations are possible as well. Here, piezoelectric sensors or micromechanical semiconductor sensors may be used as acceleration sensors. However, other sensor types are possible as well.

The present invention propose a system for sensing a head-on collision in which an upfront sensor generates the plausibility signal. The plausibility signal may be generated as a function of the acceleration signal and the speed signal, that is, the integrated acceleration signal. In the process, a logical OR-operation of the comparisons of the acceleration and speed signal with the respective thresholds may be implemented. In an example embodiment, it is provided that the plausibility signal, for example, the result of the OR-operation, is buffer-stored for a certain period of time, for example, 10 ms, making it possible to continue providing a plausibility signal for a certain time period even if the plausibility sensor is unavailable, for example because it was destroyed in a head-on collision. Furthermore, it is checked whether the signal of the impact sensor in the control device, i.e. of the acceleration sensor as well, is below the noise threshold. If this is the case, the triggering algorithm is not started and a triggering of the restraint means is thus inhibited. However, the triggering algorithm is started if this signal is above the noise threshold. If the instantaneous plausibility signal or the buffer-stored plausibility signal is present as well, the control device is ready to trigger. If a triggering decision is made by the algorithm, a triggering of the restraint means takes place.

The term impact sensor is used as a generic term in this context, whereas an upfront sensor denotes an impact sensor in the vehicle front, usually in the crash crumple zone. Acceleration sensors are generally used as impact sensors. However, strain-sensing elements, pressure sensors and temperature sensors, for example, may be used as well.

Figure 1:
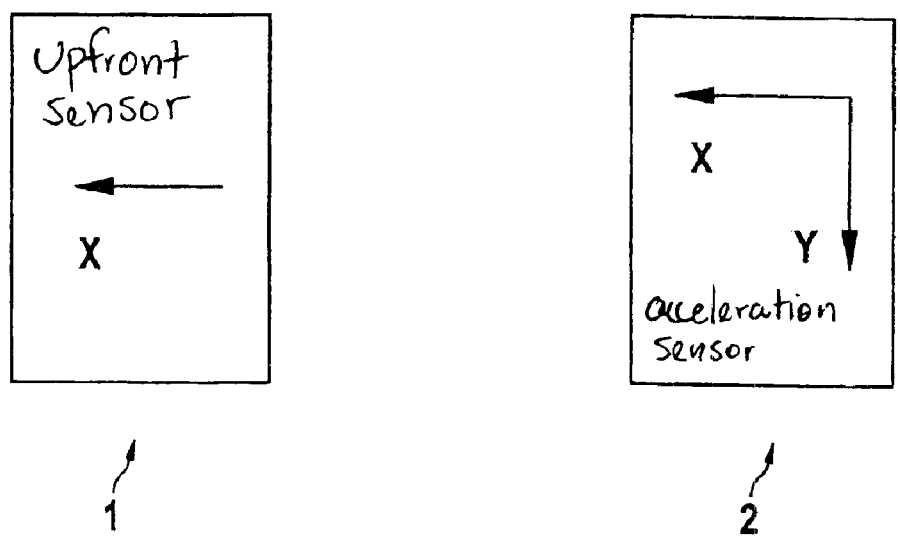
FIG. 1 illustrates a view of the locations of the impact sensor according to an example embodiment of the present invention.

FIG. 1, in an overall view, shows the locations of the acceleration sensor and upfront sensor included in the control device of a vehicle according to an example embodiment of the present invention. An upfront sensor 1 senses accelerations in the X-direction, in this case, in the longitudinal vehicle direction. However, the control device includes an acceleration-sensor system for impact detection, which detects accelerations both in the X-direction as well as the Y-direction, i.e., in the transverse vehicle direction. This then allows the detection of side impacts as well. Upfront sensor 1 is to be installed at appropriate locations in the vehicle, for example, at the radiator support or the hood-locking support.

Figure 2:
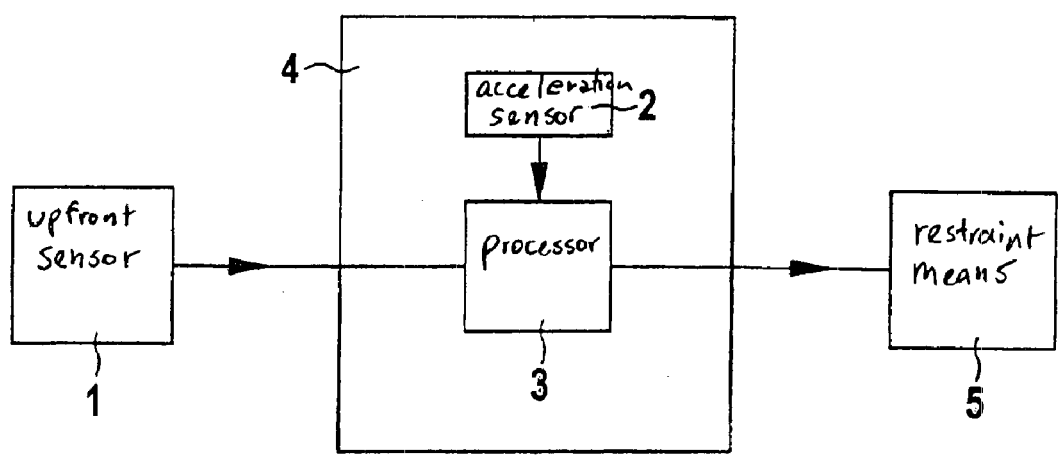
FIG. 2 illustrates a block diagram of the system according to an example embodiment of the present invention.

FIG. 2 shows a system according to an example embodiment of the present invention as a block diagram. The system includes an upfront sensor 1, a control device 4 with the acceleration-sensor system 2 and a processor 3 as well as a connection to restraint means 5.

Upfront sensor 1 is connected to processor 3 via a line, for example, a line such as is used to supply its power. This will then allow a power-line communication, i.e. the power transmitted to sensor 1 is modulated for the sensor data.

Acceleration-sensor system 2 is connected to the second data input of processor 3. Via a data output, processor 3 is connected to restraint means 5, that is, to belt tighteners and air bags. For this purpose, restraint means 5 are provided with firing circuits so as to trigger these restraint means 5 if a crash is detected. Sensors 1 and 2 include signal processing means, which amplify and digitize the acceleration signals. Processor 3 then calculates a triggering algorithm as a function of the signals transmitted by impact sensors 1 and 2 in order to determine whether restraint means 5 are to be fired. Fixed thresholds for the sensor signals and/or also adaptively calculated thresholds may be utilized in this triggering algorithm. Using the acceleration and speed signals makes it possible to detect soft and hard crashes. In soft crashes, it may only be necessary to fire a belt-tightener, whereas, in hard crashes, air bags may generally have to be fired as well. Furthermore, the activation of restraint means 5 is to be implemented as a function of a passenger detection. This means, it must also be detected whether persons occupy the respective vehicle seats and whether restraint means have to be fired for these persons without endangering them.

Figure 3:
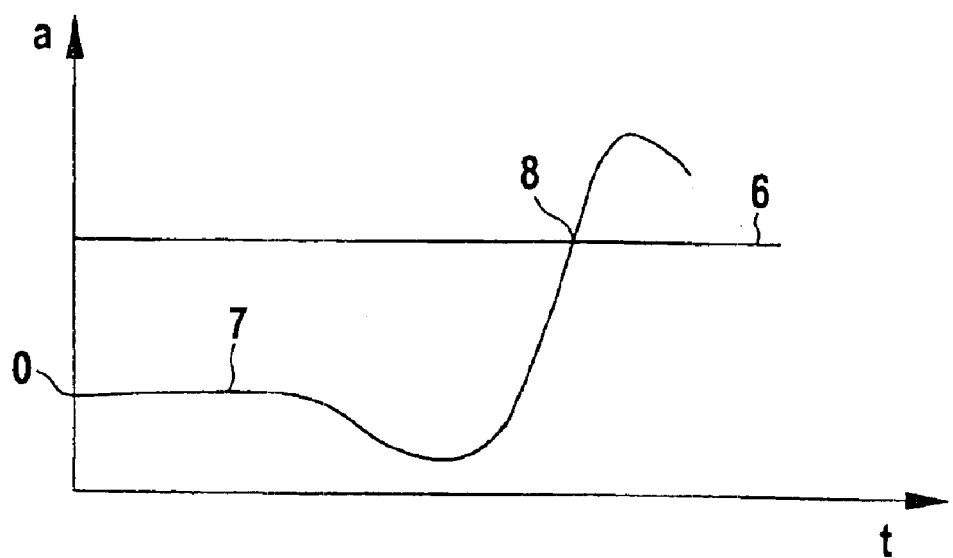
FIG. 3 illustrates an acceleration time graph according to an example embodiment of the present invention.

FIG. 3 shows an acceleration time graph of an acceleration signal that is supplied from upfront sensor 1 according to an example embodiment of the present invention. Upfront sensor 1, of which several may be present as well, generates an acceleration signal 7, which is compared to a predefined threshold 6. At time 8, signal 7 exceeds acceleration threshold 6. At this instant, a hard crash is detected here and a corresponding plausibility signal must be transmitted to processor 3, or processor 3 determines from transmitted acceleration signal 7 that the plausibility conditions for hard crashes have been satisfied. This results in the alternatives of acceleration sensor 1 transmitting only sensor data to processor 3 or transmitting the already analyzed plausibility signal. The analyzed plausibility signal indicates whether at least one threshold—acceleration and speed—was exceeded by the upfront sensor signal.

Figure 4:
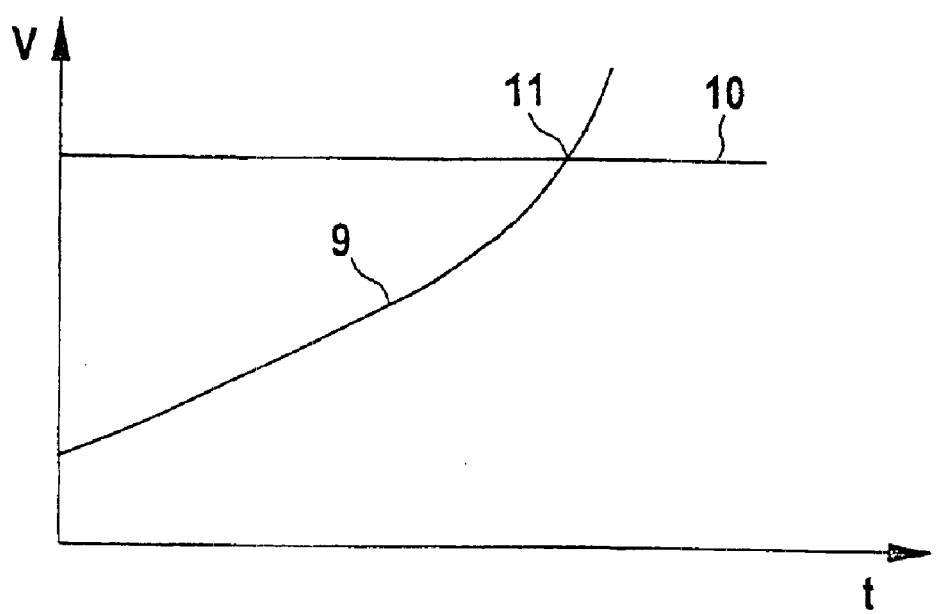
FIG. 4 illustrates a speed time graph according to an example embodiment of the present invention.

FIG. 4 shows a speed time graph in which the integrated acceleration signal 9, for example, the speed signal, is compared to threshold 10. At time 11, a satisfaction of the plausibility condition is detected, so that a soft crash has occurred. This, too, is detected either by processor 3 or an appropriate electronic system in sensor 1.

Figure 5:
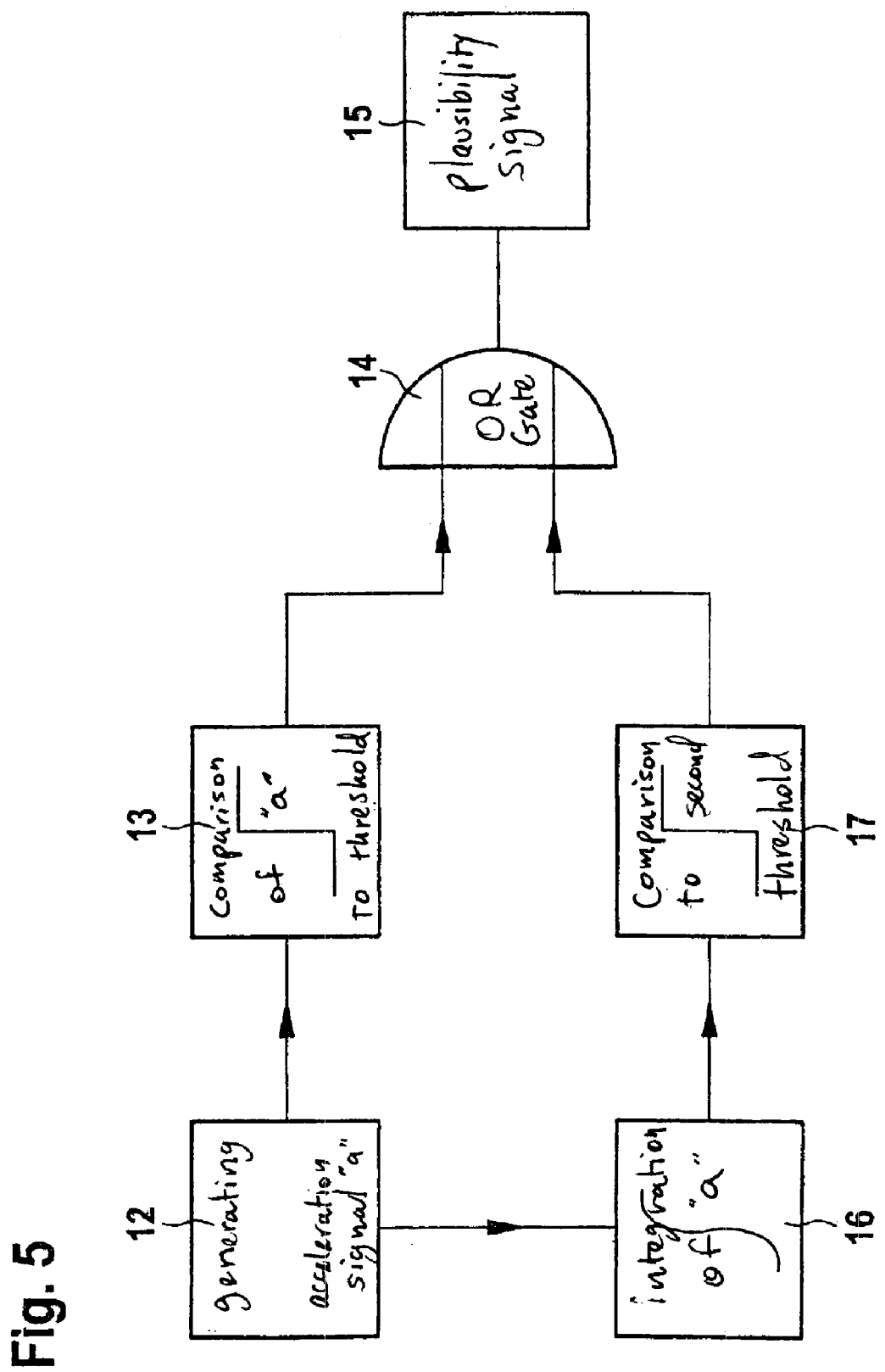
FIG. 5 illustrates a schematic diagram showing the arrangement used for detecting the plausibility signal according to an example embodiment of the present invention.

FIG. 5 shows a schematic drawing of the signal processing arrangement with respect to the plausibility signals. In block 12, acceleration sensor 1 generates acceleration signal a. This acceleration signal a is compared in block 13 to threshold 6, where, if threshold 6 has been exceed, a plausibility signal is generated which is introduced into an OR-operation 14 as the first input variable. However, acceleration signal a is also integrated in block 16, so that a speed signal is generated. In block 17, this speed signal is then compared to threshold 10. The output signal of block 17, that is, whether or not threshold 10 has been exceeded as well, is introduced into OR-gate 14 as the second input variable. If at least one of the two thresholds 6 or 10 has been exceeded, a plausibility signal is generated in block 15, which is used to decide whether or not a triggered decision made by the triggering algorithm leads to the physical triggering of the restraint means. This will then depend on the acceleration signal of acceleration-sensor system 2.

The plausibility signal in block 15 may be buffer-stored for a specified period of time, for instance 10 ms, in order to be available for a certain time, even if upfront sensor 1 is unavailable, so that, if appropriate, the triggering algorithm may be implemented if a plausibility signal is present. To be present, in this context, means that the plausibility signal indicates a crash.

What is claimed is:

1. A system for sensing a head-on collision in a vehicle, comprising:
   a control device;
   at least one first impact sensor disposed in the control device; and
   at least one additional impact sensor disposed in a vehicle front end as an upfront sensor serving as a plausibility sensor for the at least one first impact sensor in the control device;
   wherein the control device is configured to compare an acceleration signal and a speed signal of the upfront sensor to respective first and second plausibility-check thresholds to generate a plausibility signal, and wherein the control device implements a logical OR-operation of results of the comparison of the acceleration to the first plausibility-check threshold and the comparison of the speed signal to the second plausibility-check threshold.

2. The system according to claim 1, wherein the control device is configured to buffer-store the plausibility signal for a predefined time and use the buffer-stored plausibility signal for a triggering decision of a restraint device.

3. The system according to claim 1, wherein the control device is configured to inhibit a triggering of a restraint device in response to a signal of the at least one sensor in the control device being below a predefined threshold.

4. The system according to claim 1, wherein:
   the control device is configured to begin a triggering algorithm using previously acquired and stored plausibility checks by the upfront sensor, when a malfunction of the upfront sensor occurs during a crash; and
   a triggering decision determined by the triggering algorithm results in a triggering of a restraint device in accordance with a signal of the at least one first impact sensor in the control device that is above a predefined threshold.

* * * * *